US012054974B2

(12) United States Patent
Duriez et al.

(10) Patent No.: US 12,054,974 B2
(45) Date of Patent: Aug. 6, 2024

(54) LATCH FOR A MOTOR VEHICLE DOOR LEAF

(71) Applicant: U-SHIN FRANCE, Creteil (FR)

(72) Inventors: Laurent Duriez, Abbeville (FR); Francois Debroucke, Abbeville (FR); Jean-Baptiste Grislain, Abbeville (FR)

(73) Assignee: U-SHIN FRANCE, Créteil (FR)

( * ) Notice: Subject to any disclaimer, the term of this patent is extended or adjusted under 35 U.S.C. 154(b) by 239 days.

(21) Appl. No.: 17/083,865

(22) Filed: Oct. 29, 2020

(65) Prior Publication Data

US 2021/0123271 A1 Apr. 29, 2021

(30) Foreign Application Priority Data

Oct. 29, 2019 (FR) .................................... 19/12157

(51) Int. Cl.
*E05B 85/26* (2014.01)
*E05B 81/04* (2014.01)
*E05B 85/24* (2014.01)

(52) U.S. Cl.
CPC .............. *E05B 85/26* (2013.01); *E05B 81/04* (2013.01); *E05B 85/243* (2013.01)

(58) Field of Classification Search
CPC ........ E05B 85/20; E05B 85/24; E05B 85/243; E05B 85/26; E05B 81/04; E05B 81/14; Y10T 292/1047; Y10T 292/1082; Y10S 292/23
See application file for complete search history.

(56) References Cited

U.S. PATENT DOCUMENTS

| | | | | | |
|---|---|---|---|---|---|
| 4,172,768 | A * | 10/1979 | Cerdan | E05B 85/26 292/216 |
| 4,203,621 | A * | 5/1980 | Noel | E05B 85/26 292/216 |
| 5,979,951 | A * | 11/1999 | Shimura | E05B 83/40 292/216 |

(Continued)

FOREIGN PATENT DOCUMENTS

| | | |
|---|---|---|
| DE | 2847888 | 5/1980 |
| DE | 102012013779 | 4/2014 |

(Continued)

OTHER PUBLICATIONS

Office Action issued in corresponding CN Application 202011177956.0, issued Feb. 23, 2024, and an English Translation, 15 pages.

*Primary Examiner* — Kristina R Fulton
*Assistant Examiner* — Noah Horowitz
(74) *Attorney, Agent, or Firm* — Burris Law, PLLC

(57) ABSTRACT

A latch for a motor vehicle includes a bolt, a pawl, and a striker. The bolt is movable in rotation about a bolt axis. The pawl is movable in rotation about a pawl axis. The latch is configured to move between a partially closed position, a totally closed position, and an open position. In the partially closed position, the pawl abuts against the bolt on a first hooking point of the pawl and the striker is trapped by the bolt. In the totally closed position, the pawl abuts against the bolt on a second hooking point of the pawl, distinct from the first hooking point of the pawl, and the striker is trapped by the bolt. In the open position, the striker is released from the bolt.

15 Claims, 7 Drawing Sheets

(56) References Cited

U.S. PATENT DOCUMENTS

| | | | | |
|---|---|---|---|---|
| 6,209,932 | B1 * | 4/2001 | Jung | E05B 85/26 292/216 |
| 8,757,683 | B2 * | 6/2014 | Schiffer | E05B 77/36 292/201 |
| 10,745,948 | B2 * | 8/2020 | Cumbo | E05B 85/26 |
| 10,808,437 | B2 * | 10/2020 | Brickner | E05B 85/26 |
| 10,837,205 | B2 * | 11/2020 | Ishiguro | E05B 81/15 |
| 11,214,995 | B2 * | 1/2022 | Schiffer | E05B 85/26 |
| 11,286,696 | B2 * | 3/2022 | Cho | E05B 81/06 |
| 2005/0167990 | A1 * | 8/2005 | Orzech | E05B 81/14 292/201 |
| 2006/0055181 | A1 * | 3/2006 | Berghahn | E05B 81/20 292/216 |
| 2010/0289274 | A1 | 11/2010 | Shafry | |
| 2018/0216374 | A1 * | 8/2018 | Hunt | E05B 85/26 |
| 2020/0232263 | A1 * | 7/2020 | Strole | E05B 81/20 |

FOREIGN PATENT DOCUMENTS

| | | | | |
|---|---|---|---|---|
| EP | 1283317 | A2 * | 2/2003 | E05B 85/26 |
| EP | 3591152 | | 1/2020 | |
| FR | 2794488 | | 12/2000 | |
| GB | 2034395 | B | 9/1982 | |
| WO | WO-2014129388 | A1 * | 8/2014 | B60N 2/01583 |

* cited by examiner

[Fig. 1A]
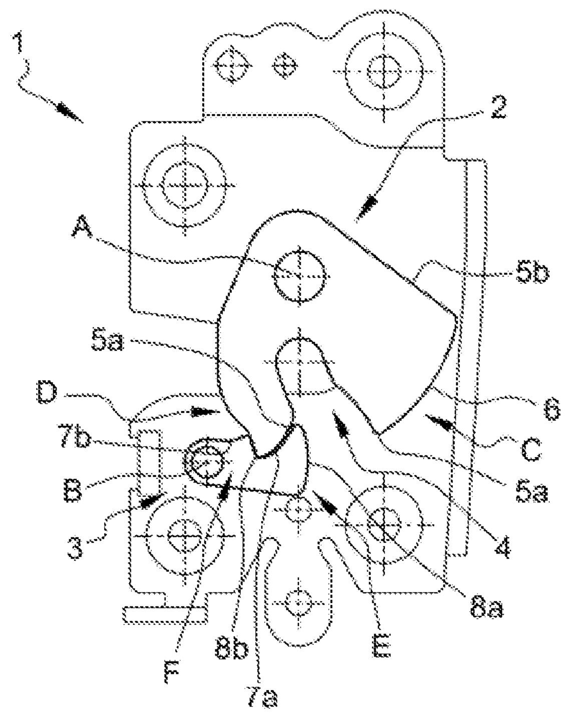

[Fig. 1B]
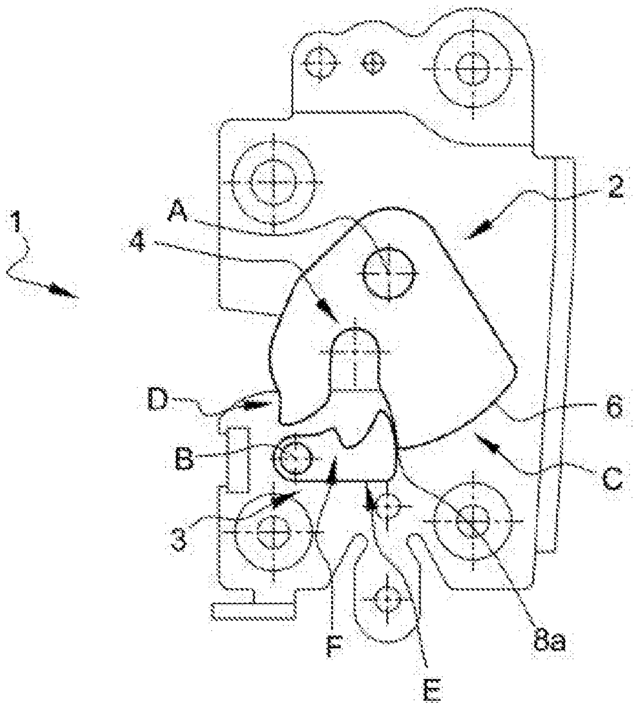

[Fig. 1C]
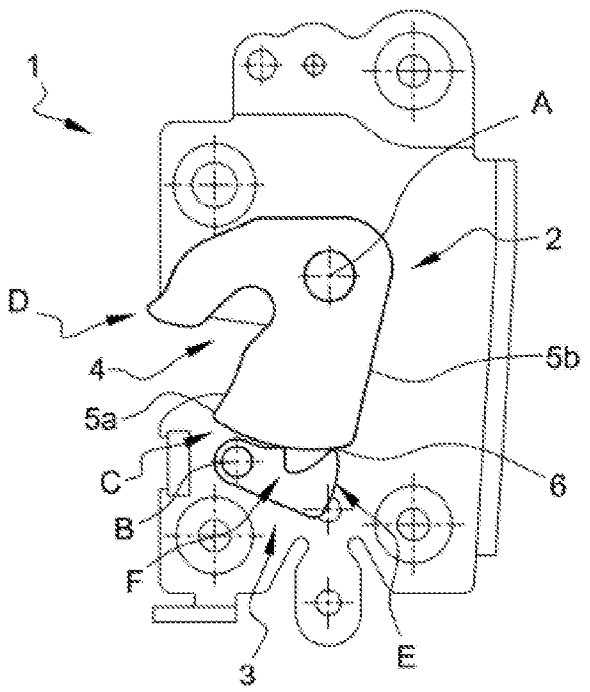

[Fig. 2A]
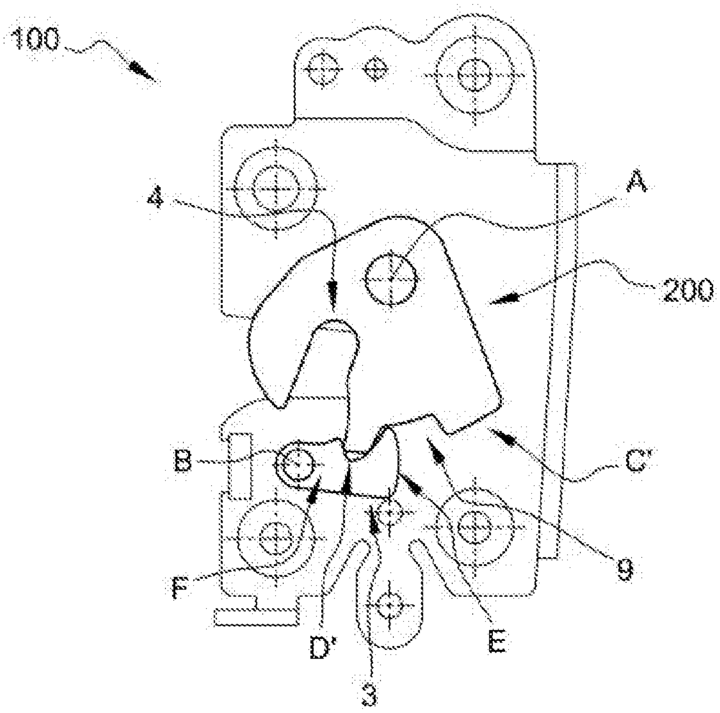

[Fig. 2B]
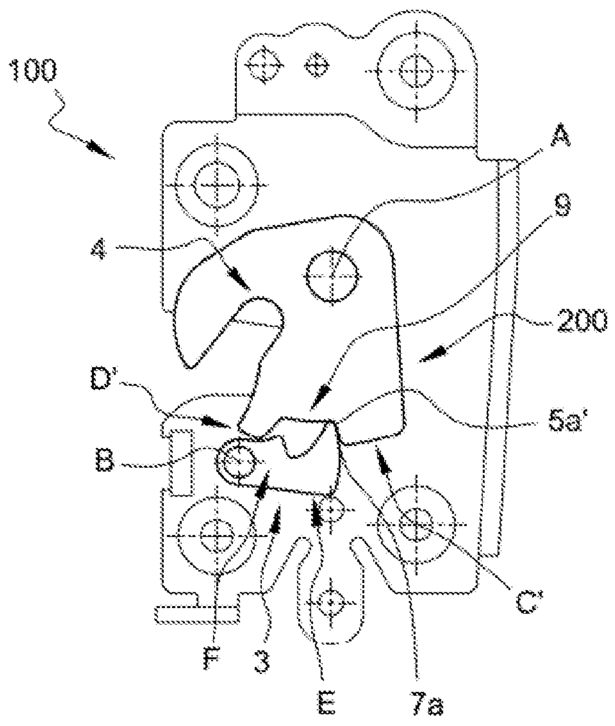

[Fig. 2C]
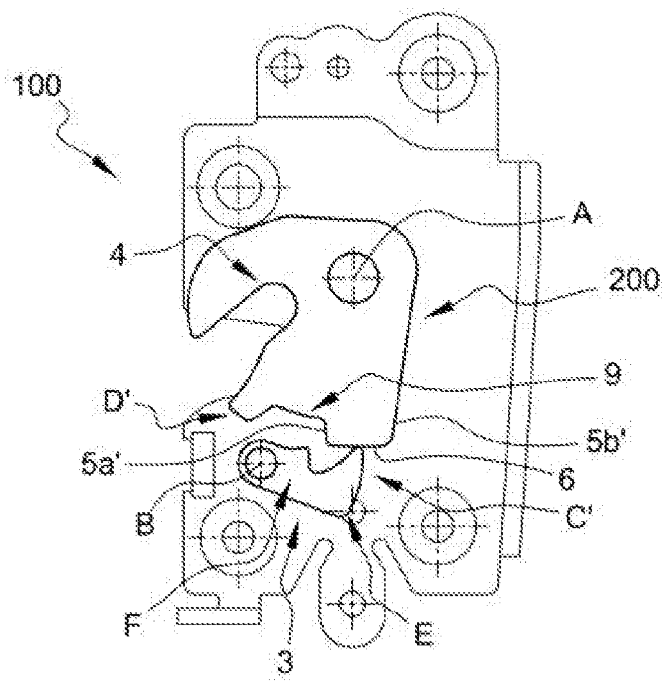

[Fig. 3]
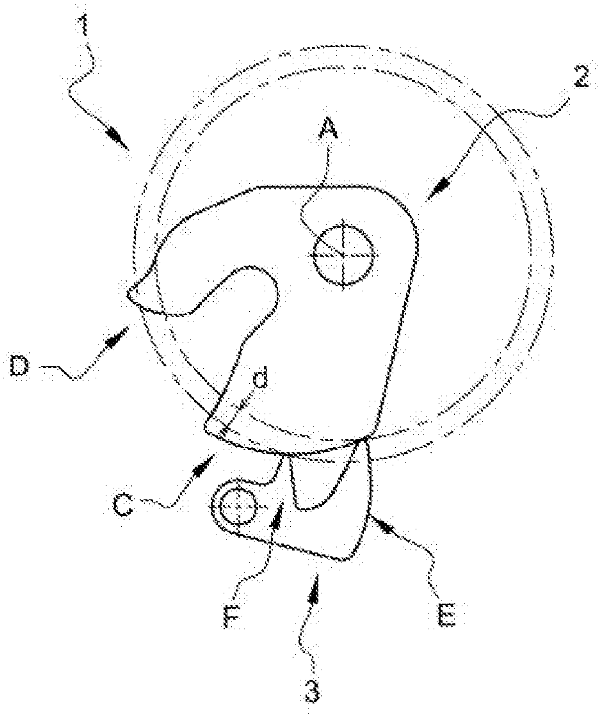

LATCH FOR A MOTOR VEHICLE DOOR LEAF

CROSS-REFERENCE TO RELATED APPLICATIONS

This application claims priority to and the benefit of FR 19/12157, filed on Oct. 29, 2019. The disclosures of the above applications are incorporated herein by reference.

FIELD

The present disclosure relates to a latch for a door leaf of a motor vehicle as well as a motor vehicle comprising such a latch.

BACKGROUND

The statements in this section merely provide background information related to the present disclosure and may not constitute prior art.

A latch of a motor vehicle is fixedly mounted on a door leaf of a motor vehicle and typically includes a bolt configured to pivot, during closure, in a direction around a striker fastened on the structure of the motor vehicle in order to ensure closure of the door leaf. Opening of the door leaf is typically enabled by rotation of the bolt in the reverse direction. The rotation in the reverse direction during the opening of the door leaf is subsequent to the displacement of the external or internal handle which is linked to the latch by a control means, for example a Bowden-type cable, which releases the bolt via a hooking device in the desired direction.

The latch typically also encloses a rotary pawl configured to retain the bolt in the closure position in which the latter holds the striker.

In typical latches, the bolt includes two hooking points and the pawl includes one single hooking point configured to abut against each of the two hooking points of the bolt, depending on the state of the door leaf.

Indeed, when the pawl abutts against a first hooking point of the bolt, the striker is trapped and the door leaf is in the partially closed position, corresponding to half-opening of the door leaf and, when the pawl abutts against a second hooking point of the bolt, the striker is trapped and the door leaf is in the totally closed position.

Finally, when the unique hooking point of the pawl no longer abutts against either one of the first and second hooking points of the bolt, the striker is released and the latch is therefore in the opening position of the door leaf.

However, these types of latches have drawbacks.

Indeed, the radius of the pawl is the same to abut against the first and second hooking points of the bolt to make the latch pass from the totally closed position to the partially closed position.

Furthermore, the opening forces of such latches are higher, in part due to the fact that the torque is generated by the pawl on the same point to pass from the totally closed position to the partially closed position.

In addition, the opening torque is imposed by car manufacturers, therefore restricting the opening force and all the more the radius of the pawl.

In addition, the noises generated by the passage of the latch from its totally closed position to its open position and passing through its partially closed position can be detrimental, for example to the user of the motor vehicle.

SUMMARY

This section provides a general summary of the disclosure and is not a comprehensive disclosure of its full scope or all of its features.

The present disclosure aims at solving at least one of the aforementioned drawbacks by providing a latch for a motor vehicle comprising a bolt, said bolt being configured to be movable in rotation about a bolt axis, a pawl, said pawl being configured to be movable in rotation about a pawl axis and a striker, said latch being configured to adopt:

- a partially closed position in which the pawl abuts against the bolt on a first hooking point of the pawl, the striker being trapped by the bolt,
- a totally closed position in which the pawl abuts against the bolt on a second hooking point of the pawl, distinct from the first hooking point of the pawl, the striker being trapped by the bolt,
- and an open position in which the striker is released from the bolt.

The pawl having two hooking points, this allows managing two different pawl radii for each hooking point.

In addition, the inter-notch passage from the totally closed position to the partially closed position of the latch is easier. Indeed, the second hooking point of the pawl is closer to the second hooking point of the bolt.

Furthermore, this considerably reduces the noises generated by the latch during the passage from the totally closed position to the open position.

Furthermore, the position of the pawl is different when the latch is in the totally closed position or in the partially closed position, by the fact that the pawl of the present disclosure comprises two distinct hooking points, the coverage of the bolt on the pawl is therefore variable throughout the different positions of the latch. This difference in the coverage of the bolt on the pawl ensures a better mechanical strength and thus reduces the risk of deformation and/or scraping of the parts composing the latch, for example in the event of an accident of the motor vehicle.

By coverage, it should be understood a length of coverage of the bolt over the pawl, that is to say the surface and the thickness of the bolt in contact with the pawl.

Finally, the present disclosure also allows for a force reduction for electrically-opened latches.

According to one form, the bolt includes a first hooking point of the bolt configured to abut against the first hooking point of the pawl in the partially closed position, and the bolt includes a second hooking point of the bolt configured to abut against the second hooking point of the pawl in the totally closed position.

Still according to one form, the first hooking point of the pawl is farther away from the pawl axis, than the second hooking point of the pawl.

In particular, the distance of the second hooking point from the pawl and the pawl axis is between 30% and 90% of the distance between the first hooking point of the pawl and the pawl axis. In one example, the distance of the second hooking point from the pawl and the pawl axis is between 50% to 80% of the distance between the first hooking point of the pawl and the pawl axis.

Still in particular, the bolt includes a continuous bearing surface configured to hold the pawl in the open position of the latch.

According to one form, the bearing surface of the bolt forms a ramp.

According to another form, the first hooking point of the pawl forms a surface with a first free end, the second hooking point of the pawl forms a second surface with a second free end, and wherein the ratio between:

the radius of a circle centered on the bolt axis and passing through the first free end, and the radius of a circle formed by the bolt axis and passing through the second free end, is between 0.1 mm and 1 mm.

According to one feature, the hooking points are formed by teeth.

According to another feature, the first hooking point of the bolt and the second hooking point of the bolt are located on either side of a housing of the bolt, said housing receiving the striker.

In one form, the first hooking point of the bolt and the second hooking point of the bolt are located on the same side with respect to a housing of the bolt, said housing receiving the striker.

In another form, the opening position is reached according to a first rotational direction about the bolt axis and the closure position is reached in a second rotational direction about the bolt axis, the bearing surface being located on a face disposed in the second rotational direction about the bolt axis with respect to a first hooking point internal surface of the bolt of the first hooking point of the bolt.

Still in another form, the displacement of the pawl is achieved by an electric actuator.

The present disclosure also concerns a motor vehicle comprising a latch having at least one of the aforementioned features.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1A is a plan view of a latch for a door leaf of a motor vehicle in a totally closed position, according to a first configuration in accordance with the teachings of the present disclosure;

FIG. 1B is a plan view similar to FIG. 1A, illustrating the latch in a partially closed position;

FIG. 1C is a plan view similar to FIG. 1A, illustrating the latch in an open position;

FIG. 2A is a plan view of a latch for a door leaf of a motor vehicle in a totally closed position, according to a second configuration in accordance with the teachings of the present disclosure;

FIG. 2B is a plan view similar to FIG. 2A, illustrating the latch in a partially closed position;

FIG. 2C is a plan view similar to FIG. 2A, illustrating the latch in an open position; and FIG. 3 is a plan view of a portion of the latch of FIG. 1 in the open position.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1A illustrates a latch 1 for a door leaf of a motor vehicle in a totally closed position, according to a first configuration.

The latch 1 includes a bolt 2 configured to rotate about a bolt axis of rotation A, a pawl 3 configured to rotate about a pawl axis of rotation B, as well as a striker (not represented).

The bolt 2 includes two hooking points of the bolt C and D and the pawl includes two hooking points of the pawl E and F.

In this first configuration, the hooking points of the bolt C and D are located on either side of a housing 4 of the bolt 2. This housing 4, corresponding to a depression of the bolt 2, is configured to receive the striker of the latch 1.

The first hooking point of the bolt C has a width larger than the second hooking point of the bolt D.

In this instance, the first hooking point of the bolt C is formed by a first hooking point internal surface of the bolt 5*a* extending substantially towards the bolt axis of rotation A, forming a portion of the housing 4 of the bolt 2 and a first hooking point external surface of the bolt 5*b* extending substantially parallel to the first hooking point internal surface of the bolt 5*a*. The first hooking point internal surface of the bolt 5*a* and the first hooking point external surface of the bolt 5*b* are connected by a bearing surface 6, forming a ramp.

The second hooking point of the pawl F is located closer to the pawl axis of rotation B than the first hooking point of the pawl E.

More specifically, the distance of the second hooking point from the pawl F and the pawl axis B is between 30% and 90% of the distance between the first hooking point of the pawl E and the pawl axis B. In one example the distance of the second hooking point from the pawl F and the pawl axis B is 50% to 80% of the distance between the first hooking point of the pawl E and the pawl axis B.

In addition, the pawl 3 substantially has an “F”-like shape. Indeed, each hooking point of the pawl E and F extends radially and perpendicularly with respect to the axis of extension of the pawl 3. The second hooking point of the pawl F is shorter than the first hooking point of the pawl E.

Each hooking point of the pawl E and F has a first hooking point internal surface of the pawl 7*a*, respectively a second hooking point internal surface of the pawl 7*b*, directed towards the pawl axis of rotation B and a first hooking point external surface of the pawl 8*a*, respectively a second hooking point external surface of the pawl 8*b*, directed opposite to the pawl axis of rotation B.

In the totally closed position of the latch 1, the second hooking point of the pawl F abuts against the second hooking point of the bolt D, so that the striker is completely trapped in the housing 4 of the bolt 2.

More specifically, the second hooking point of the bolt D is disposed between the first hooking point of the pawl E and the second hooking point of the pawl F.

Even more specifically, the second hooking point of the bolt D is disposed against the external surface 8*b* of the second hooking point of the pawl F and the internal surface 7*a* of the first hooking point of the pawl E.

The arrangement of each hooking point of the bolt C and D and of each hooking point of the pawl E and F is tooth-like shaped.

FIG. 1B shows the latch 1 in a partially closed position, according to the first configuration.

In the partially closed position, the first hooking point of the pawl E abuts against the first hooking point of the bolt C, so that the striker is always trapped in the housing 4 of the bolt 2.

More specifically, it is actually the external surface 8*a* of the first hooking point of the pawl E which is abutting against the first hooking point of the bolt C.

Even more specifically, it is actually the external surface 8*a* of the first hooking point of the pawl E which is abutting against the first hooking point internal surface of the bolt 5*a*.

The second hooking point of the pawl F and the second hooking point of the bolt D are free.

FIG. 1C shows the latch 1 in an open position, according to the first configuration.

In the open position of the latch 1, each hooking point of the pawl E and F bears against the first hooking point of the bolt C.

Indeed, a bearing surface 6, forming a ramp, is disposed between the first hooking point internal surface of the bolt 5*a* and the first hooking point external surface of the bolt 5*b*.

The free end of the first hooking point of the pawl E and the free end of the second hooking point of the pawl E bear on this bearing surface 6 formed by the first hooking point of the bolt C, in this instance the ramp.

In this position of the latch 1, the striker is released from the housing 4 of the bolt 2.

FIG. 2A shows a latch 100 in a totally closed position, according to a second configuration, which is similar to the first configuration except as otherwise shown or described herein. Accordingly, only differences are described in detail herein.

Unlike the first configuration, illustrated with reference to FIGS. 1A to 1C), the first hooking point of the bolt C' and the second hooking point of the bolt D' are located on the same side with respect to the housing 4 of the bolt 200.

Indeed, the bearing surface 6, forming the ramp, presented in the first configuration (FIGS. 1A to 1C), includes, in this second configuration, a recess 9 so as to form the first hooking point of the bolt C' and the second hooking point of the bolt D' on either side of this recess 9.

In this totally closed position of the latch 100, the second hooking point of the pawl F abuts against the second hooking point of the bolt D'. Hence, the striker is trapped in the housing 4 of the bolt 200.

FIG. 2B shows the latch 100 in a partially closed position, according to the second configuration.

In this partially closed position of the latch 100, the first hooking point of the pawl E abuts against the first hooking point of the bolt C'.

More specifically, it is actually the first hooking point external surface of the pawl 7*a* which is in contact with a hooking point internal surface of the bolt 5*a*', the hooking point internal surface of the bolt 5*a*' opening onto the recess 9 extending substantially towards the bolt axis of rotation A.

In this partially closed position, the striker is always trapped in the housing 4 of the bolt 200.

The second hooking point of the pawl F and the second hooking point of the bolt D' are free.

FIG. 2C shows the latch 100 in the open position, according to the second configuration.

In this open position of the latch 100, the first hooking point of the pawl E bears against the first hooking point of the bolt C'.

More specifically, it is the free end of the first hooking point of the pawl E which abuts against a bearing surface 6, forming a ramp, constituted between the hooking point internal surface of the bolt 5*a*' and a first hooking point external surface of the bolt 5*b*' extending substantially parallel to the first hooking point internal surface of the bolt 5*a*', the first hooking point internal surface of the bolt 5*a*' and the first hooking point external surface of the bolt 5*b*' being connected by the ramp.

In this open position of the latch 100, the striker is released from the bolt 200.

FIG. 3 shows the latch 1 in an open position, according to the first configuration.

A first circle centered on the bolt axis A, passing through the first free end of the second hooking point of the pawl F is illustrated as well as a second circle centered on the bolt axis A, passing through the first free end of the first hooking point of the pawl E.

Hence, these two circles represent the contact spacing between the first hooking point of the pawl E and the second hooking point of the pawl F, in the opening position of the latch 1.

In this position, the ratio d between the radius of the circle centered on the bolt axis A and passing through the first free end, and the radius of the circle formed by the bolt axis A and passing through the second free end, is between 0.1 mm and 1 mm.

This ratio is also valid for the second configuration, in the open position of the latch 100 as illustrated in FIG. 2C.

In the next paragraphs, the operation of the present latch 1, 100 is explained.

When a person wishes to open the door of his or her motor vehicle, for example, the person pulls on a handle disposed on a door leaf of the vehicle. This handle is linked to the latch 1, 100, by a Bowden-type cable, for example.

Prior to pulling the handle, the latch 1, 100 is in the totally closed position. The striker is therefore trapped in the housing 4 of the bolt 2, 200. In this instance, the second hooking point of the pawl F abuts against the second hooking point of the bolt D, D'.

When the person pulls on the handle, the Bowden-type cable is pulled, thereby driving the bolt 2, 200 in rotation about the bolt axis A, clockwise, so that the second hooking point of the bolt D, D' is released from the second hooking point of the pawl F and the first hooking point of the pawl E abuts against the first hooking point of the bolt C, C', corresponding to the partially closed position of the latch 1, 100. Thus, the first hooking point of the bolt C, C' is released from the first hooking point of the pawl E and the pawl 2 bears against the bearing surface 6 forming the ramp of the bolt 2, 200 corresponding to the open position of the latch 1, 100, and the striker is released from the housing 4 of the bolt 2, 200.

When the person wishes to close the door of the vehicle, the reverse way is performed by the latch 1, 100.

In each of the described configurations, the displacement of the pawl 3 may optionally be achieved by an electric actuator, so that the handle is no longer linked to the latch 1, 100 by a Bowden-type cable, for example.

It is understood that all simple modifications or the combination of elements derived from different variants of the teachings of the present disclosure are within the scope of the present disclosure.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A latch for a motor vehicle comprising:

a bolt, said bolt being configured to be movable in rotation about a bolt axis;

a pawl, said pawl being configured to be movable in rotation about a pawl axis; and a striker, wherein said latch is configured to move between:

a partially closed position in which a first pawl hooking point abuts against the bolt, the striker is trapped by the bolt, and a second pawl hooking point does not engage the bolt, a totally closed position in which a first bolt hooking point of the bolt abuts against the first pawl hooking point and the second pawl hooking point and the striker is trapped by the bolt, the second pawl hooking point being distinct from the first pawl hooking point, the pawl axis and the first pawl hooking point being located respectively in pawl opposite end parts, and the second pawl hooking point being located in an intermediary part between the pawl opposite end parts, and an open position in which the striker is released from the bolt.

2. The latch according to claim 1, wherein the bolt comprises a second bolt hooking point configured to abut against the first pawl hooking point in the partially closed position.

3. The latch according to claim 1, wherein the first pawl hooking point is farther away from the pawl axis, than the second pawl hooking point.

4. The latch according to claim 3, wherein the distance between the second pawl hooking point and the pawl axis is between 30% and 90% of the distance between the first pawl hooking point and the pawl axis.

5. The latch according to claim 4, wherein the distance between the second pawl hooking point and the pawl axis is between 50% to 80% of the distance between the first pawl hooking point and the pawl axis.

6. The latch according to claim 3, wherein the first pawl hooking point forms a surface with a first free end, the second pawl hooking point forms a second surface with a second free end, and wherein the difference between:

a. the radius of a circle centered on the bolt axis and passing through the first free end, and b. the radius of a circle formed by the bolt axis and passing through the second free end, is between 0.1 mm and 1 mm.

7. The latch according to claim 1, wherein the bolt comprises a continuous bearing surface configured to hold the pawl in the open position of the latch.

8. The latch according to claim 7, wherein the bearing surface of the bolt forms a ramp.

9. The latch according to claim 7, wherein the open position is reached according to a first rotational direction about the bolt axis and the totally closed position is reached in a second rotational direction about the bolt axis, the bearing surface being located on a face disposed in the second rotational direction about the bolt axis with respect to an internal surface of the first bolt hooking point.

10. The latch according to claim 1, wherein the first and second pawl hooking points are formed by teeth.

11. The latch according to claim 1, wherein the first bolt hooking point and a second bolt hooking point are located respectively on either sides of a plane including the bolt axis and crossing a bolt housing, said bolt housing receiving the striker.

12. The latch according to claim 1, wherein the first bolt hooking point and a second bolt hooking point are located on a same side with respect to a plane including the bolt axis and crossing a bolt housing, said bolt housing receiving the striker.

13. The latch according to claim 1, wherein the displacement of the pawl is achieved by an electric actuator.

14. A motor vehicle comprising the latch according claim 1.

15. The latch according to claim 1, wherein the pawl has an F-like shape, the pawl axis being located at a bottom of the F-like shape.

* * * * *